US012512284B2

(12) United States Patent
Fujiwara

(10) Patent No.: US 12,512,284 B2
(45) Date of Patent: Dec. 30, 2025

(54) ELECTRIC CIRCUIT BREAKER DEVICE

(71) Applicant: DAICEL CORPORATION, Osaka (JP)

(72) Inventor: Tomohide Fujiwara, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 38 days.

(21) Appl. No.: 18/285,132

(22) PCT Filed: Mar. 25, 2022

(86) PCT No.: PCT/JP2022/014384
§ 371 (c)(1),
(2) Date: Sep. 29, 2023

(87) PCT Pub. No.: WO2022/210354
PCT Pub. Date: Oct. 6, 2022

(65) Prior Publication Data
US 2024/0186092 A1 Jun. 6, 2024

(30) Foreign Application Priority Data
Mar. 31, 2021 (JP) ................................ 2021-059907

(51) Int. Cl.
*H01H 39/00* (2006.01)
*H01H 71/02* (2006.01)

(52) U.S. Cl.
CPC ...... *H01H 39/006* (2013.01); *H01H 71/0207* (2013.01)

(58) Field of Classification Search
CPC ......... H01H 2039/008; H01H 71/0207; H01H 39/00–006
See application file for complete search history.

(56) References Cited

U.S. PATENT DOCUMENTS 10,622,176 B2 4/2020 Volkmann et al.
2010/0172064 A1 7/2010 Takahashi
(Continued)

FOREIGN PATENT DOCUMENTS

JP 2009-16652 A 1/2009
JP 2011-204591 A 10/2011
(Continued)

OTHER PUBLICATIONS

International Search Report for International Application No. PCT/JP2022/014384, dated May 31, 2022, with an English translation.
(Continued)

*Primary Examiner* — Jacob R Crum
(74) *Attorney, Agent, or Firm* — BIRCH, STEWART, KOLASCH & BIRCH, LLP

(57) ABSTRACT

An electric circuit breaker device includes a housing, an igniter, a projectile, and a conductor piece including, between a first connection end portion and a second connection end portion, a cutoff portion to be cut by movement of the projectile, in which a boundary portion with the cutoff portion from which the cutoff portion is cut in the first connection end portion of the conductor piece held in the housing is defined as a first cutting edge portion, and a boundary portion with the cutoff portion from which the cutoff portion is cut in the second connection end portion is defined as a second cutting edge portion, and a groove is formed at a position corresponding to the conductor piece crossing an accommodating space and in a predetermined inter-edge inner wall region positioned between the first cutting edge portion and the second cutting edge portion, in an inner wall surface of the housing.

4 Claims, 21 Drawing Sheets

(56) References Cited

U.S. PATENT DOCUMENTS

| | | | | |
|---|---|---|---|---|
| 2010/0218659 | A1* | 9/2010 | Ukon | H01H 39/006 83/639.1 |
| 2017/0229268 | A1* | 8/2017 | Goldman | H01H 9/342 |
| 2017/0263403 | A1* | 9/2017 | Marlin | H01H 71/10 |
| 2019/0287751 | A1* | 9/2019 | Gonthier | H01H 85/0241 |
| 2021/0233729 | A1 | 7/2021 | Nakatani et al. | |

FOREIGN PATENT DOCUMENTS

| | | | |
|---|---|---|---|
| JP | 2012-138247 | A | 7/2012 |
| JP | 2012-230876 | A | 11/2012 |
| WO | WO 2019/235082 | A1 | 12/2019 |
| WO | WO 2020/093079 | A1 | 5/2020 |

OTHER PUBLICATIONS

Written Opinion of the International Searching Authority for International Application No. PCT/JP2022/014384, dated May 31, 2022, with an English translation.

Extended European Search Report for European Application No. 22780567.8, dated Feb. 14, 2025.

* cited by examiner

ELECTRIC CIRCUIT BREAKER DEVICE

TECHNICAL FIELD

The present invention relates to an electric circuit breaker device.

BACKGROUND ART

An electric circuit may be provided with a breaker device that is actuated when an abnormality occurs in a device constituting the electric circuit or when an abnormality occurs in a system in which the electric circuit is mounted, thereby urgently interrupting the continuity of the electric circuit. As one aspect thereof, there has been proposed an electric circuit breaker device that forcibly and physically cuts a conductor piece forming a portion of an electric circuit by moving a projectile at high speed by energy applied from an igniter or the like (see, for example, Patent Document 1). Further, in recent years, electric circuit breaker devices applied to electric vehicles equipped with a high-voltage power source are becoming increasingly important.

CITATION LIST

Patent Documents

Patent Document 1: WO 2020/093079
Patent Document 2: JP 2012-230876 A
Patent Document 3: JP 2011-204591 A
Patent Document 4: JP 2009-16652 A

SUMMARY OF INVENTION

Technical Problem

In an electric circuit breaker device, when a conductor piece is cut by actuation of an igniter, arc discharge may occur between conductor pieces to be cut off from each other. In this case, there has been a problem that the insulation between the end portions of the cut conductor piece is lowered by the copper of the conductor piece evaporated by the heat of the arc and adhering to the inside of the device.

The technology of the present disclosure has been made in view of the above circumstances, and an object of the technology is to provide an electric circuit breaker device capable of ensuring high insulation between end portions of a cut conductor piece.

Solution to Problem

To solve the above problem, an electric circuit breaker device according to the present disclosure includes a housing that encloses an accommodating space extending in one direction as an outer shell member; an igniter provided in the housing; a projectile that is disposed in the housing, is projected from one end side of the accommodating space by energy received from the igniter, and moves along an extending direction of the accommodating space; and a conductor piece held by the housing and forming a portion of an electric circuit, the conductor piece including a cutoff portion between a first connection end portion of one side and a second connection end portion on the other side, the cutoff portion being to be cut off by movement of the projectile and disposed crossing the accommodating space. In the electric circuit breaker device, a boundary portion with the cutoff portion from which the cutoff portion is cut off in the first connection end portion of the conductor piece held by the housing is defined as a first cutting edge portion, and a boundary portion with the cutoff portion from which the cutoff portion is cut off in the second connection end portion is defined as a second cutting edge portion, and a groove is formed at a position corresponding to the conductor piece crossing the accommodating space and in a predetermined inter-edge inner wall region positioned between the first cutting edge portion and the second cutting edge portion, in an inner wall surface of the housing.

The groove may extend along an extending direction of the accommodating space.

In the electric circuit breaker device, a plurality of the grooves may be provided at intervals along a circumferential direction of the inter-edge inner wall region.

In the electric circuit breaker device, a plurality of the grooves may be provided parallel to each other or radially in a surface whose depth direction is orthogonal to an extending direction of the accommodating space.

Advantageous Effects of Invention

According to the present disclosure, it is possible to provide an electric circuit breaker device capable of ensuring high insulation between end portions of cut conductor pieces.

DESCRIPTION OF EMBODIMENTS

First Embodiment

An electric circuit breaker device according to an embodiment of the present disclosure will be described below with reference to the drawings. Note that each of the configurations, combinations thereof, and the like in the embodiment are an example, and various additions, omissions, substitutions, and other changes may be made as appropriate without departing from the spirit of the present disclosure. The present disclosure is not limited by the embodiment and is limited only by the claims.

Configuration

Figure 1:
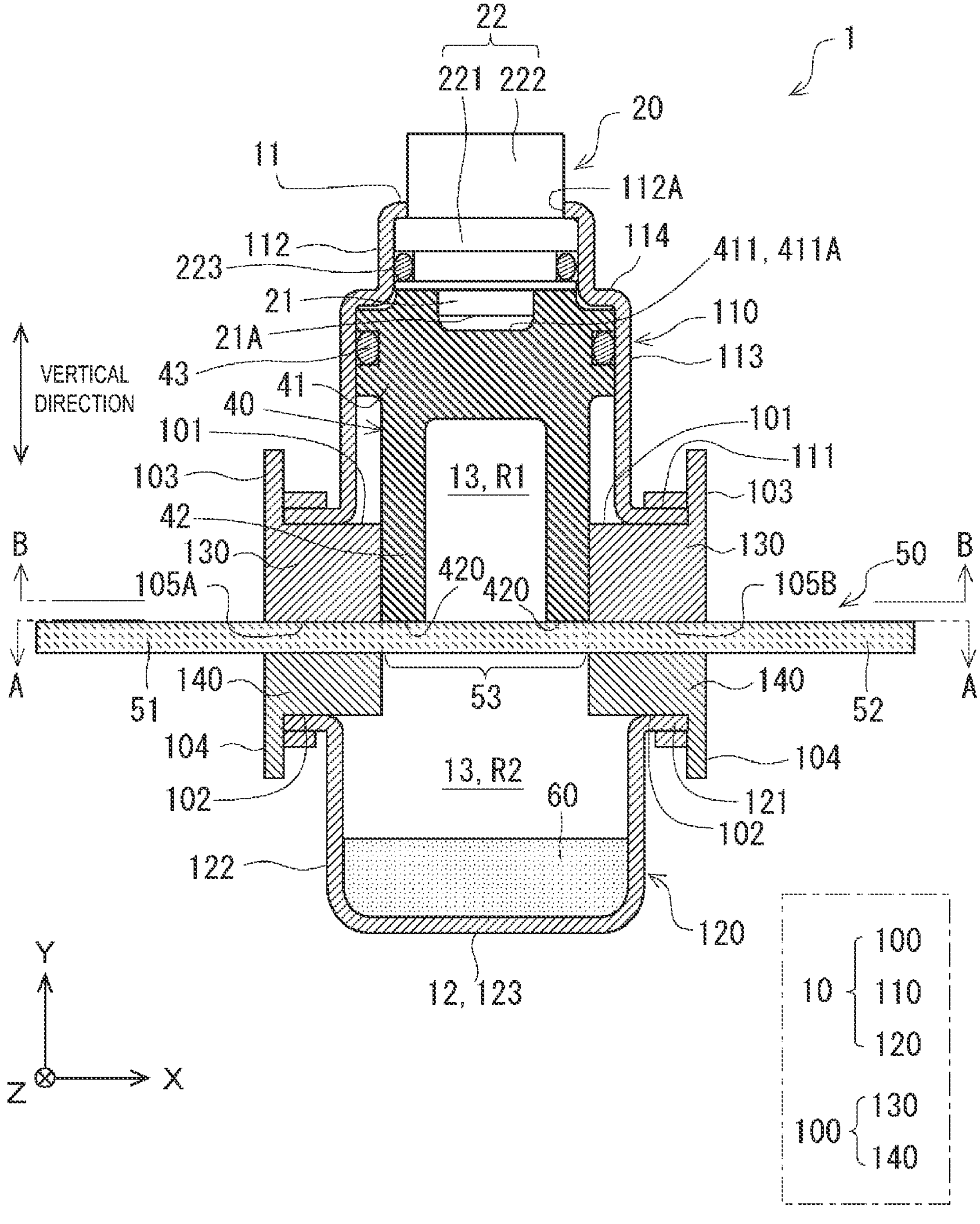
FIG. 1 is a view illustrating an internal structure of an electric circuit breaker device according to an embodiment.
Figure 2:
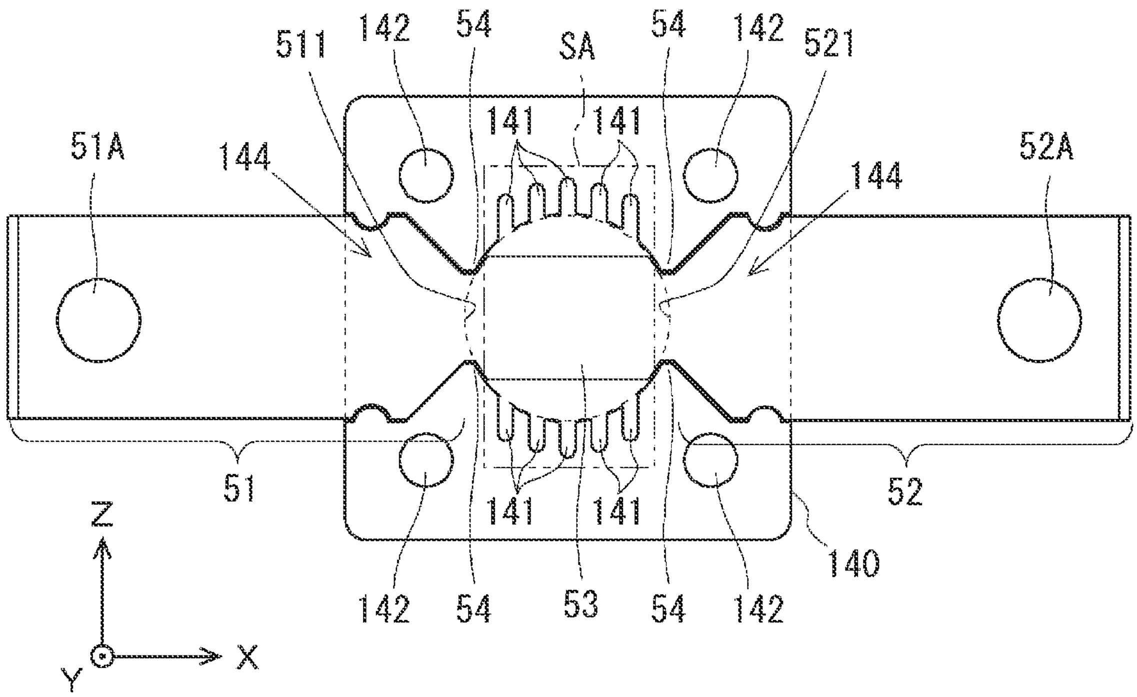
FIG. 2 is a cross-sectional view taken along line A-A in FIG. 1.
Figure 3:
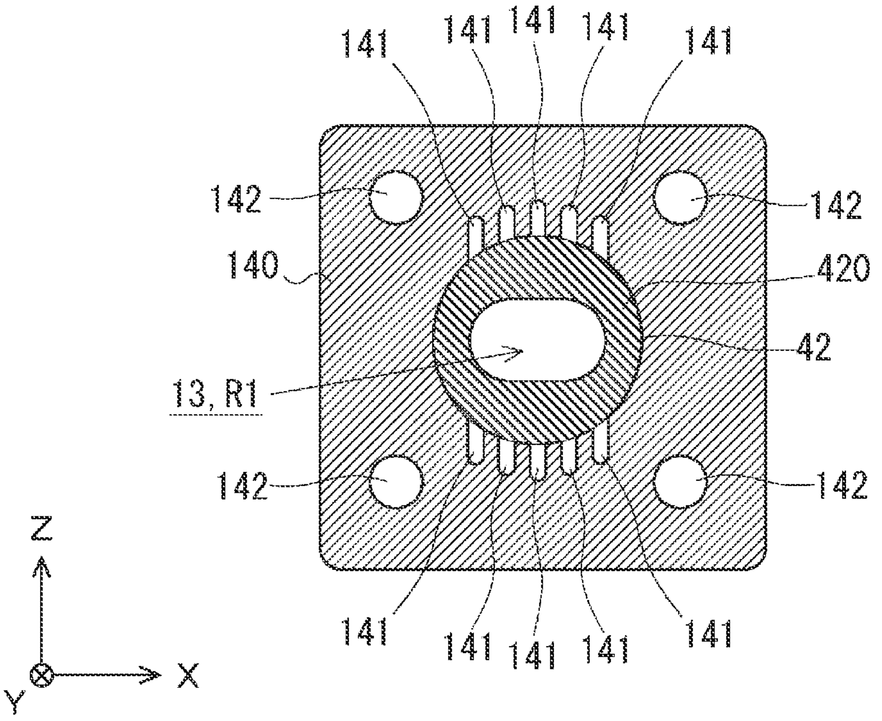
FIG. 3 is a cross-sectional view taken along line B-B in FIG. 1.

FIG. 1 is a view illustrating an internal structure of an electric circuit breaker device (hereinafter, simply referred to as a "breaker device") 1 according to an embodiment, FIG. 2 is a cross-sectional view taken along line A-A in FIG. 1, and FIG. 3 is a cross-sectional view taken along line B-B in FIG. 1. The breaker device 1 is a device that interrupts an electric circuit included in a vehicle, an electric home appliance, a photovoltaic system, or the like when an abnormality occurs in the electric circuit or in a system including a battery (lithium ion battery, for example) of the electric circuit, thereby preventing great damage. In the present specification, a cross section in the height direction in FIG. 1 (direction in which an accommodating space 13 described later extends) is referred to as a vertical cross section of the breaker device 1, and a cross section in a direction orthogonal to the height direction is referred to as a transverse cross section of the breaker device 1. FIG. 1 illustrates a state prior to actuation of the breaker device 1.

The breaker device 1 includes a housing 10, an igniter 20, a projectile 40, a conductor piece 50, and coolant material 60. The housing 10 encloses, as an outer shell member, an accommodating space 13 extending in a direction from a first end portion 11 on an upper end side toward a second end portion 12 on a lower end side. This accommodating space 13 is a space formed linearly, making the projectile 40 movable, and extends along a vertical direction of the breaker device 1. As illustrated in FIG. 1, the projectile 40 is accommodated on the upper end side in the vertical direction (extending direction) of the accommodating space 13 formed inside the housing 10. In the present specification, the vertical direction is also referred to as a Y axis direction, the horizontal direction is also referred to as an X axis direction, and the depth direction is also referred to as a Z direction. However, in the present specification, the vertical direction and the XYZ directions of the breaker device 1 merely indicate a relative positional relationship of elements in the breaker device 1 for convenience of description of the embodiment. For example, the orientation at the time of installing the breaker device 1 is not limited to the direction illustrated in the drawing.

Housing

The housing 10 includes a housing body 100, a top holder 110, and a bottom container 120. The housing body 100 is bonded to the top holder 110 and the bottom container 120, thereby forming the housing 10 that is integral.

The housing body 100 is divided in the vertical direction with the position where the conductor piece 50 is disposed as a boundary, and includes an upper housing body 130 in an upper portion and a lower housing body 140 in a lower portion. In the present embodiment, the upper side of the housing 10 including this upper housing body 130 and the top holder 110 is also referred to as a first housing, and the lower side of the housing 10 including the lower housing body 140 and the bottom container 120 is also referred to as a second housing. Note that the housing body is not limited to the divided configuration, and may be integrally formed from the upper end connected to the top holder 110 to the lower end connected to the bottom container 120.

The housing body 100 in a state where the upper housing body 130 and the lower housing body 140 are combined has, for example, a substantially rectangular columnar outer shape. However, the shape of the housing body 100 is not particularly limited. The housing body 100 includes a cavity portion formed therethrough along the vertical direction. This cavity portion forms a portion of the accommodating space 13. Furthermore, the housing body 100 includes an upper surface 101 to which a flange portion 111 of the top holder 110 is fixed and a lower surface 102 to which a flange portion 121 of the bottom container 120 is fixed. In the present embodiment, an upper tubular wall 103 having a tubular shape is provided erected upward from the upper surface 101 on the outer circumferential side of the upper surface 101 in the housing body 100. In the present embodiment, the upper tubular wall 103 has a rectangular tubular shape, for example, but may have other shapes. On the outer circumferential side of the lower surface 102 in the housing body 100, a lower tubular wall 104 having a tubular shape is provided suspended downward from the lower surface 102. In the present embodiment, the lower tubular wall 104 has a rectangular tubular shape, for example, but may have other shapes.

Figure 4:
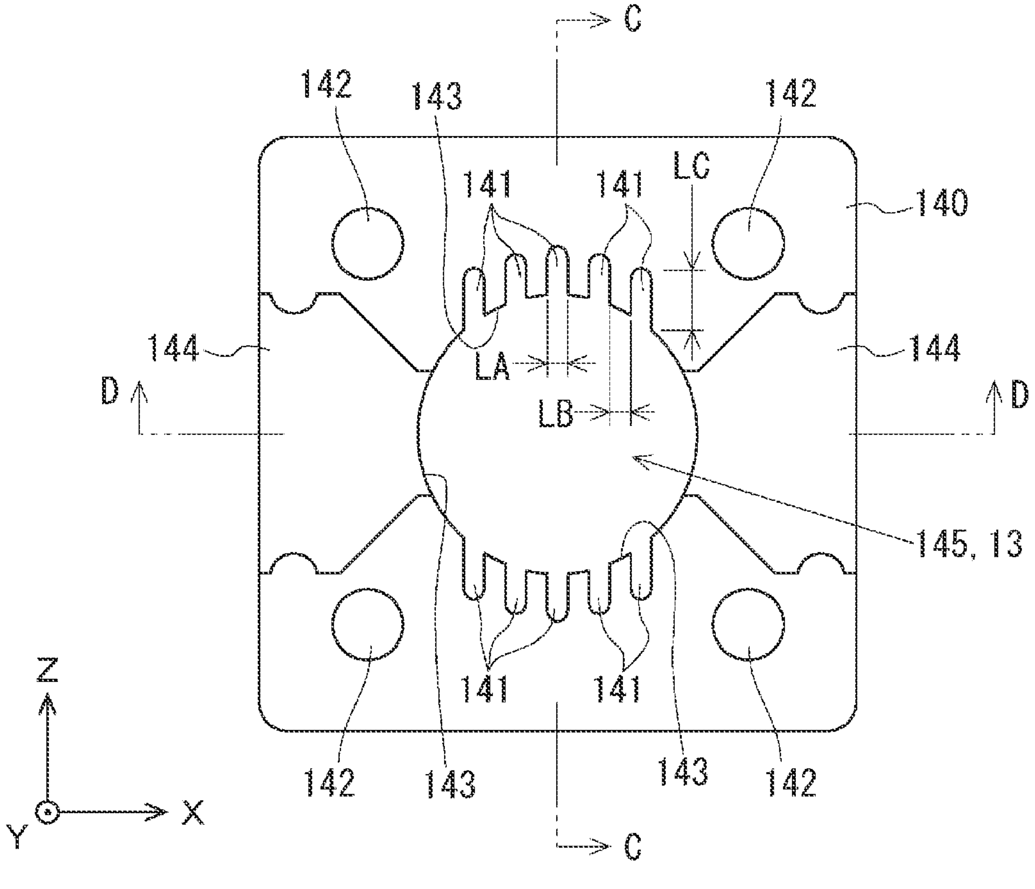
FIG. 4 is a top view of a lower housing body.
Figure 5:
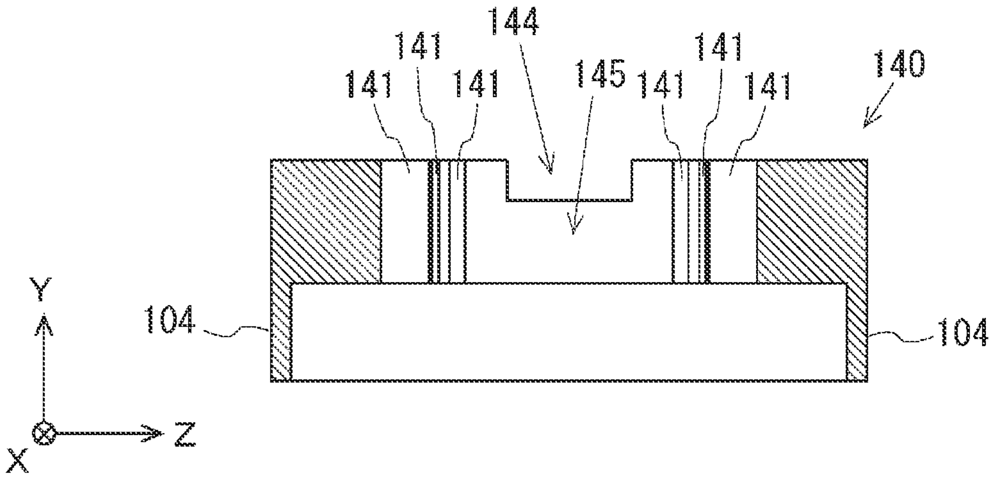
FIG. 5 is a vertical cross-sectional view of the lower housing body taken along line C-C in FIG. 4.
Figure 6:
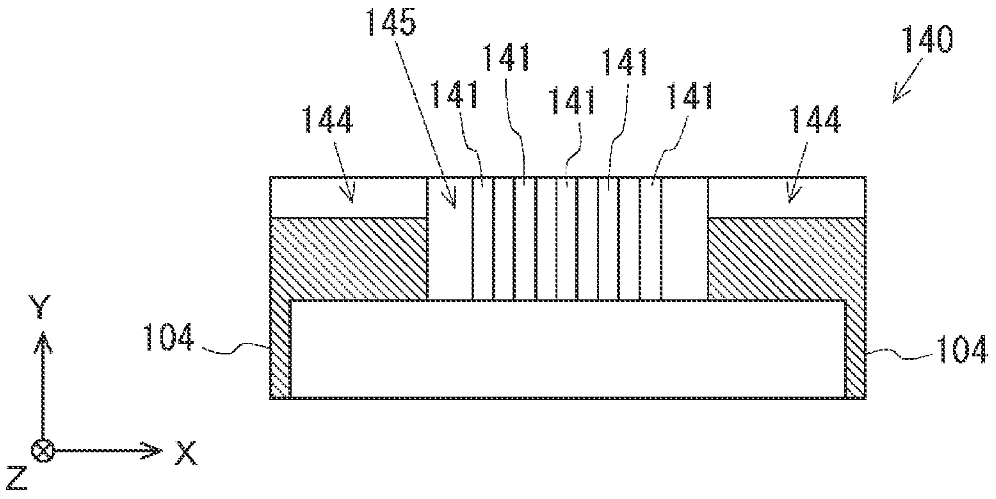
FIG. 6 is a vertical cross-sectional view of the lower housing body taken along line D-D in FIG. 4.
Figure 7:
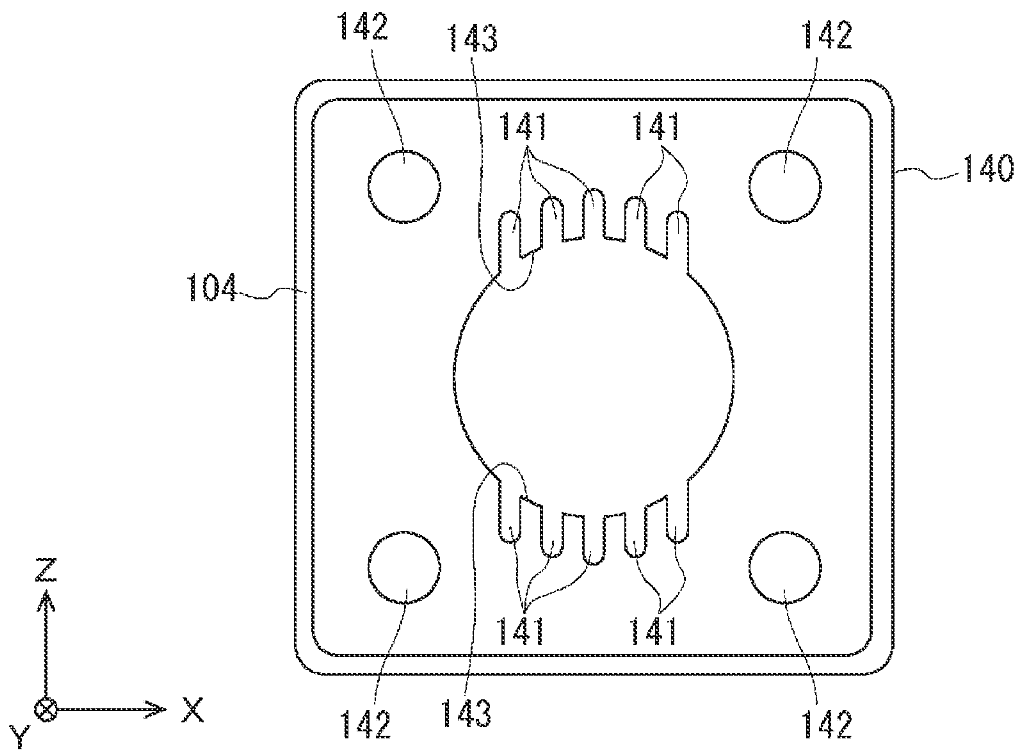
FIG. 7 is a bottom view of the lower housing body.

FIG. 4 is a top view of the lower housing body 140, FIG. 5 is a vertical cross-sectional view of the lower housing body 140 taken along line C-C in FIG. 4, FIG. 6 is a vertical cross-sectional view of the lower housing body 140 taken along line D-D in FIG. 4, and FIG. 7 is a bottom view of the lower housing body 140.

As illustrated in FIG. 4, the lower housing body 140 has a substantially quadrangular outer shape in plan view, and a cavity portion 145 is provided at the center thereof. This cavity portion 145 forms a portion of the accommodating space 13 when the lower housing body 140 is combined with another member included in the housing 10. Left and right of the cavity portion 145 are provided with conductor piece holding portions 144, which are recesses into which the conductor piece 50 is fitted. The conductor piece holding portions 144 each have a shape in which the upper surface of the lower housing body 140 is recessed downward along the contour of the conductor piece 50. By fitting the end portion of the conductor piece 50 into this conductor piece holding portions 144, the conductor piece 50 is disposed crossing the cavity portion 145 (accommodating space 13).

An inner wall 143 defining the cavity portion 145 of the lower housing body 140 is provided with a plurality of grooves 141 from the upper surface to the lower surface of the lower housing body 140. As illustrated in FIG. 6, the grooves 141 are provided in linear shapes that are long along the vertical direction and parallel to one another. That is, the grooves 141 extend along the extending direction of the accommodating space 13. The grooves 141 are disposed at predetermined intervals along the circumferential direction of the cavity portion 145 (accommodating space 13). The grooves 141 are formed in the inner wall 143 in a predetermined inter-edge inner wall region SA positioned between a first cutting edge portion 511 and a second cutting edge portion 521 of the conductor piece 50 to be cut at the time of operation of the breaker device 1 as described later. As illustrated in FIGS. 4 and 7, the grooves 141 are formed and the shapes in the depth direction (Z direction) from the inner wall 143 toward the outer wall of the housing 10 have linear shapes parallel to one another on an X-Z plane. Dimensions such as a width LA, an interval LB, and a depth LC of each of the grooves 141 are not particularly limited, but for example, the width LA may be set according to the voltage applied to the conductor piece 50. The groove 141 of the present embodiment is a slit-type groove having the width LA narrower than the depth LC. The groove 141 is not limited to a straight line, and may have another shape.

By setting the interval LB of each of the grooves 141 to be small, the grooves 141 can be densely disposed, and the number of grooves 141 can be increased to lengthen the creepage distance described later, but, if the interval LB is made too small, it becomes difficult to ensure strength, and therefore the interval LB may be set according to a required creepage distance and strength. By setting the depth LC of each of the grooves 141 to be deep, the creepage distance described later can be lengthened, but, if the interval LC is made too deep, it becomes difficult to ensure strength, and therefore the depth LC may be set according to a required creepage distance and strength.

As illustrated in FIGS. 4 and 7, the lower housing body 140 is provided with bolt passing holes 142 penetrating in the vertical direction at four corners. On an outer edge portion of the lower surface of the lower housing body 140, a lower tubular wall 104 having a rectangular tubular shape is provided suspended downward from the lower surface.

Figure 8:
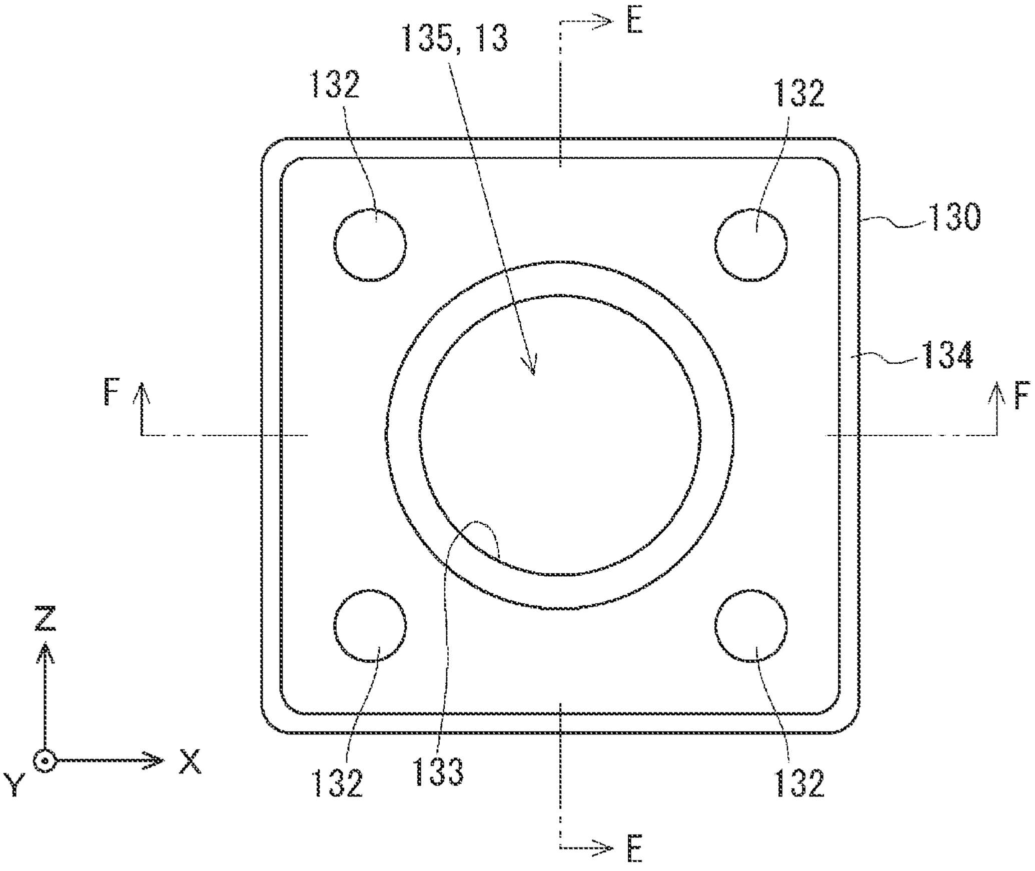
FIG. 8 is a top view of an upper housing body.
Figure 9:
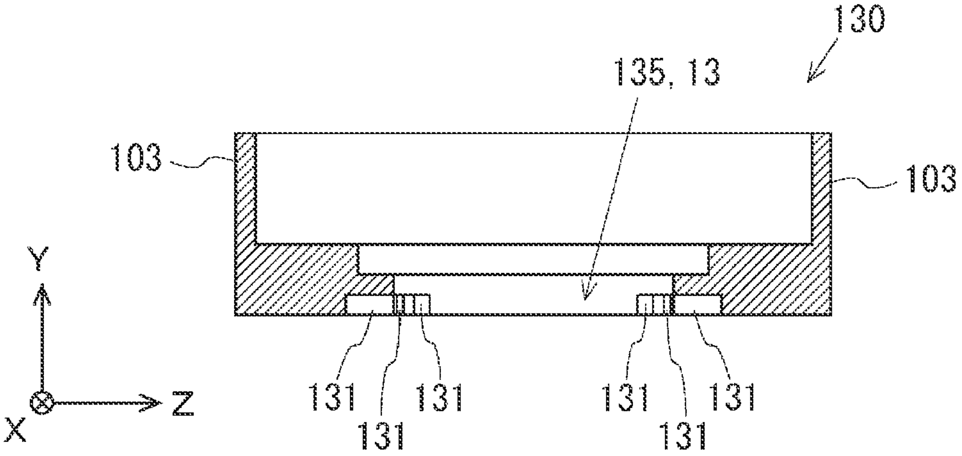
FIG. 9 is a vertical cross-sectional view of the upper housing body taken along line E-E in FIG. 8.
Figure 10:
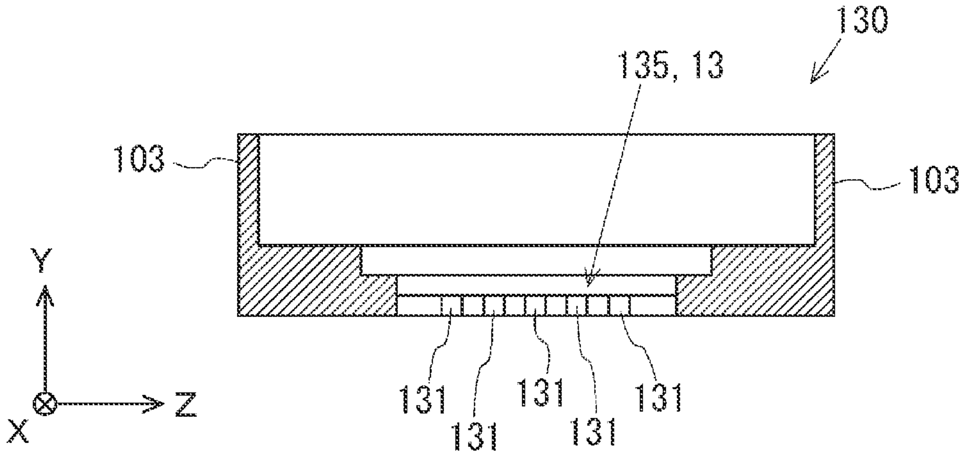
FIG. 10 is a vertical cross-sectional view of the upper housing body taken along line F-F in FIG. 8.
Figure 11:
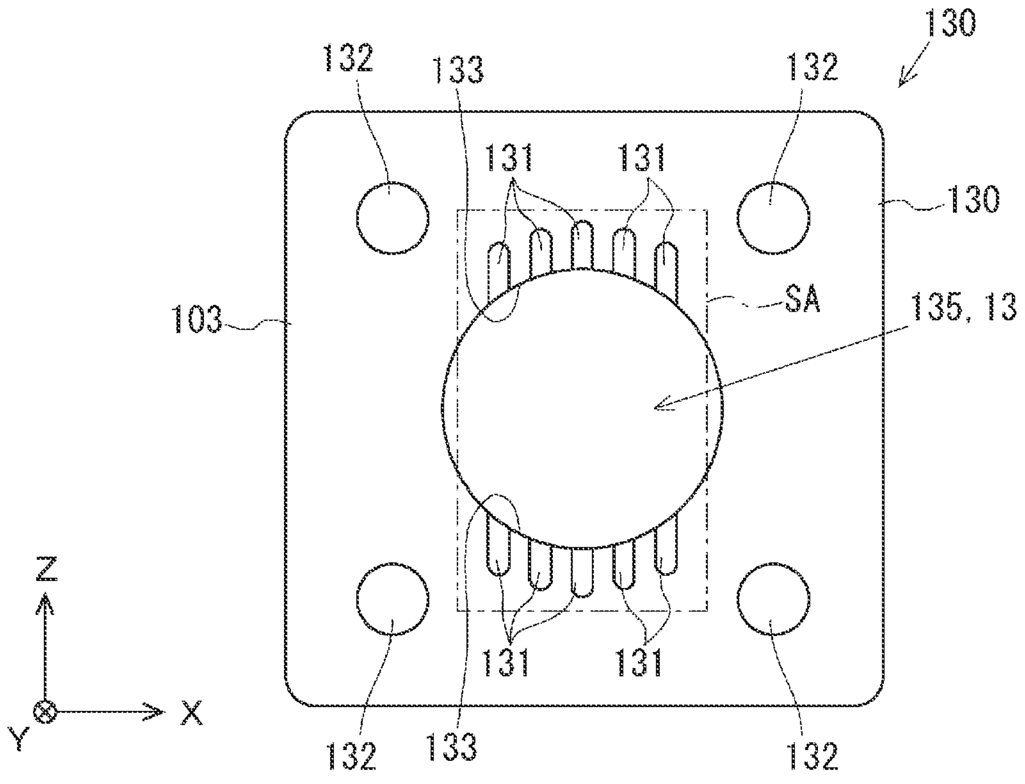
FIG. 11 is a bottom view of the upper housing body.

FIG. 8 is a top view of the upper housing body 130, FIG. 9 is a vertical cross-sectional view of the upper housing body 130 taken along line E-E in FIG. 8, FIG. 10 is a vertical cross-sectional view of the upper housing body 130 taken along line F-F in FIG. 8, and FIG. 11 is a bottom view of the upper housing body 130.

As illustrated in FIGS. 8 and 11, the upper housing body 130 has a substantially quadrangular outer shape in plan view, and a cavity portion 135 is provided at the center thereof. This cavity portion 135 forms a portion of the accommodating space 13 when the upper housing body 130 is combined with another member included in the housing 10.

An inner wall 133 defining the cavity portion 135 of the upper housing body 130 is provided with a plurality of grooves 131 upward from the lower surface of the upper housing body 130. Each of the grooves 131 extends along the extending direction of the accommodating space 13. The grooves 131 are disposed at predetermined intervals along the circumferential direction of the cavity portion 135 (accommodating space 13). The grooves 131 are formed in the inner wall 133 in the predetermined inter-edge inner wall region SA positioned between the first cutting edge portion 511 and the second cutting edge portion 521 of the conductor piece 50 to be cut at the time of operation of the breaker device 1 as described later. As illustrated in FIG. 10, the grooves 131 are provided in parallel to one another along the vertical direction. As illustrated in FIGS.-8 and 11, the grooves 131 are formed in linear shapes parallel to one another in the depth direction (Z direction) from the inner wall 133 toward the outer wall of the housing 10 on the X-Z plane. Dimensions such as the width, the interval, and the depth of the grooves 131 are not particularly limited and can be arbitrarily set similarly to those of the grooves 141 of the lower housing body 140.

As illustrated in FIGS. 8 and 11, the upper housing body 130 is provided with bolt passing holes 132 penetrating in the vertical direction at four corners. On an outer edge portion of the upper surface of the upper housing body 130, an upper tubular wall 103 having a rectangular tubular shape is provided erected upward from the upper surface.

The upper housing body 130 and the lower housing body 140 configured as described above can be formed from an insulating member such as a synthetic resin, for example. For example, the upper housing body 130 and the lower housing body 140 may be formed from nylon, which is a type of polyamide synthetic resin.

Top Holder Next, the top holder 110 will be described. The top holder 110 is, for example, a cylindrical member having a stepped cylindrical tubular shape with a hollow inside. The top holder 110 includes a small diameter cylinder portion 112 positioned on the upper side (first end portion 11 side), a large diameter cylinder portion 113 positioned on the lower side, a connection portion 114 connecting these, and the flange portion 111 extending outward from a lower end of the large diameter cylinder portion 113. For example, the small diameter cylinder portion 112 and the large diameter cylinder portion 113 are coaxially disposed, and the large diameter cylinder portion 113 has a diameter slightly larger than that of the small diameter cylinder portion 112.

The contour of the flange portion 111 in the top holder 110 has a substantially quadrangular shape that fits inside the upper tubular wall 103 in the housing body 100. The flange portion 111 is provided with a bolt passing hole (not illustrated) through which a fastening bolt passes penetrating in the vertical direction.

The cavity portion formed inside the small diameter cylinder portion 112 in the top holder 110 functions as an accommodating space for accommodating a portion of the igniter 20 as illustrated in FIG. 1. Further, the cavity portion formed inside the large diameter cylinder portion 113 in the top holder 110 communicates with the cavity portion of the housing body 100 positioned below, and forms a portion of the accommodating space 13. The top holder 110 configured as described above can be formed from an appropriate metal member, such as stainless steel or aluminum, having excellent strength and durability, for example. However, a material for forming the top holder 110 is not particularly limited. Also, for the shape of the top holder 110, the above aspect is an example and other shapes may be adopted.

Bottom Container

Next, the bottom container 120 will be described. The bottom container 120 has a substantially tubular bottomed shape with a hollow inside, and includes a side wall portion 122, a bottom wall portion 123 connected to a lower end of the side wall portion 122, and a flange portion 121 connected to an upper end of the side wall portion 122. The side wall portion 122 has, for example, a cylindrical tubular shape. The flange portion 121 extends outward from the upper end of the side wall portion 122. The contour of the flange portion 121 in the bottom container 120 has a substantially quadrangular shape that fits inside the lower tubular wall 104 in the housing body 100. The flange portion 121 is provided with a bolt passing hole (not illustrated) through which a fastening bolt passes penetrating in the vertical direction.

Note that the above aspect regarding the shape of the bottom container 120 is an example, and other shapes may be adopted. Further, the cavity portion formed inside the bottom container 120 communicates with the housing body 100 positioned above, and forms a portion of the accommodating space 13. The bottom container 120 configured as described above can be formed from an appropriate metal member, such as stainless steel or aluminum, having excellent strength and durability, for example. However, a material for forming the bottom container 120 is not particularly limited. Further, the bottom container 120 may have a multilayer structure. For example, in the bottom container 120, an exterior portion facing the outside may be formed from an appropriate metal member, such as stainless steel or aluminum, having excellent strength and durability, and an interior portion facing the accommodating space 13 may be formed from an insulating member such as a synthetic resin. Of course, the entire bottom container 120 may be formed from an insulating member.

As described above, the housing 10 in the present embodiment is configured by vertically integrally assembling the top holder 110, the upper housing body 130, the lower housing body 140, and the bottom container 120. In the process of this assembly, the conductor piece 50 is disposed through the inside of the housing body 100. For example, the conductor piece 50 is fitted into the conductor piece holding portions 144 of the lower housing body 140, and the conductor piece is disposed crossing the cavity portion 145. The lower surface of the upper housing body 130 abuts against the upper surface of the lower housing body 140 and thus the bolt passing hole 142 of the lower housing body 140 and the bolt passing hole 132 of the upper housing become coaxial in this state. Furthermore, the flange portion 111 of the top holder 110 is inserted inside the upper tubular wall 103 of the upper housing body 130 to dispose the top holder 110 on the upper housing body 130, and the flange portion 121 of the bottom container 120 is inserted inside the lower tubular wall 104 of the lower housing body 140 to dispose the bottom container 120 under the lower housing body 140. Then, bolts are passed through the bolt passing holes of the top holder 110, the upper housing body 130, the lower housing body 140, and the bottom container 120 to fasten the respective portions. Note that the bolt is not necessarily used for the fastening, and the fastening may be performed by other fastening means such as a rivet.

Each portion may be bonded in a state where a sealant is applied between the top holder 110 and the upper housing body 130, between the upper housing body 130 and each of the lower housing body 140 and the conductor piece 50, between the lower housing body 140 and the conductor piece 50, and between the lower housing body 140 and the bottom container 120. This can increase airtightness of the accommodating space 13 formed in the housing 10. The airtightness of the accommodating space 13 may be enhanced by interposing a packing or a gasket between the portions in place of the sealant or in combination with the sealant. This accommodating space 13 accommodates the igniter 20, the projectile 40, a cutoff portion 53 of the conductor piece 50, the coolant material 60, and the like described in detail below.

Igniter

Next, the igniter 20 will be described. The igniter 20 is an electric igniter that includes an ignition portion 21 with an ignition charge, and an igniter body 22 including a pair of conduction pins (not illustrated) connected to the ignition portion 21. The igniter body 22 is surrounded by an insulating resin, for example. Further, tip end sides of the pair of conduction pins in the igniter body 22 are exposed to the outside, and are connected to a power source when the breaker device 1 is used.

The igniter body 22 includes a body portion 221 having a substantially circular columnar shape and accommodated inside the small diameter cylinder portion 112 in the top holder 110, and a connector portion 222 positioned on the body portion 221. The igniter body 22 is fixed to the small diameter cylinder portion 112 by, for example, the body portion 221 being pressed to an inner circumferential surface of the small diameter cylinder portion 112. Further, a constricted portion having an outer circumferential surface recessed as compared with other locations is annularly formed along a circumferential direction of the body portion 221 at an axially intermediate portion of the body portion 221. An O-ring 223 is fitted into this constricted portion. The O-ring 223 is formed from, for example, rubber (silicone rubber, for example) or a synthetic resin, and functions to increase airtightness between the inner circumferential surface in the small diameter cylinder portion 112 and the body portion 221.

The connector portion 222 in the igniter 20 is disposed protruding to the outside through an opening 112A formed at an upper end of the small diameter cylinder portion 112. The connector portion 222 has, for example, a cylindrical tubular shape covering sides of the conduction pins, allowing connection with a connector of a power source.

As illustrated in FIG. 1, the ignition portion 21 of the igniter 20 is disposed facing the accommodating space 13 (more specifically, the cavity portion formed inside the large diameter cylinder portion 113) of the housing 10. The ignition portion 21 is configured as a form accommodating an ignition charge in an igniter cup, for example. For example, the ignition charge is accommodated in the igniter cup in the ignition portion 21 in a state of being in contact with a bridge wire (resistor) suspended coupling the base ends of the pair of conduction pins to each other. As the ignition charge, for example, zirconium—potassium perchlorate (ZPP), zirconium—tungsten—potassium perchlorate (ZWPP), titanium hydride—potassium perchlorate (THPP), lead tricinate, or the like may be adopted.

In actuation of the igniter 20, when an actuating current for igniting the ignition charge is supplied from the power source to the conduction pins, the bridge wire in the ignition portion 21 generates heat, and as a result, the ignition charge in the igniter cup is ignited and burns, generating a combustion gas. Then, the pressure in the igniter cup increases along with the combustion of the ignition charge in the igniter cup of the ignition portion 21, a rupture surface 21A of the igniter cup ruptures, and the combustion gas is discharged from the igniter cup into the accommodating space 13. More specifically, the combustion gas from the igniter cup is discharged into a recess 411 in a piston portion 41 described later of the projectile 40 disposed in the accommodating space 13.

Projectile

Figure 12:
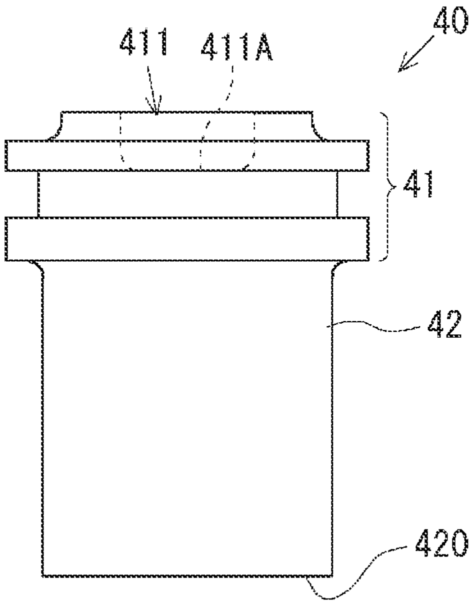
FIG. 12 is a front view of a projectile.
Figure 13:
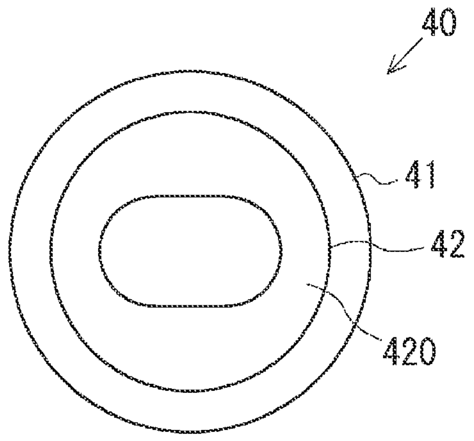
FIG. 13 is a bottom view of the projectile.
Figure 14:
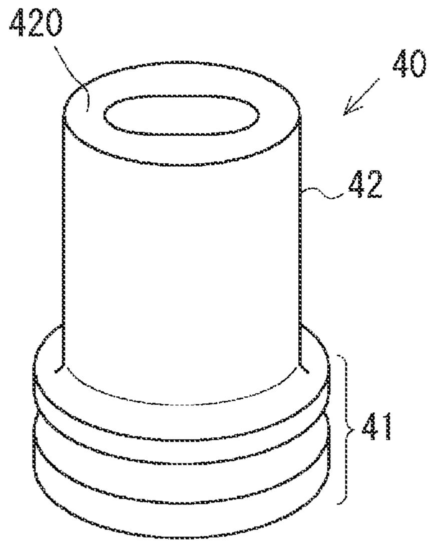
FIG. 14 is a perspective view of the projectile.

Next, the projectile 40 will be described. FIG. 12 is a front view of the projectile 40, FIG. 13 is a bottom view of the projectile 40, and FIG. 14 is a perspective view of the projectile 40. Note that in FIG. 14, the lower surface of the projectile 40 is illustrated facing upward in the drawing and thus the lower surface of the projectile 40 is illustrated. The projectile 40 is formed from an insulating member such as a synthetic resin, for example, and includes the piston portion 41 and a rod portion 42 connected to the piston portion 41. The piston portion 41 has a substantially circular columnar shape and has an outer diameter substantially corresponding to an inner diameter of the large diameter cylinder portion 113 in the top holder 110. For example, the diameter of the piston portion 41 may be slightly smaller than the inner diameter of the large diameter cylinder portion 113. The shape of the projectile 40 can be changed as appropriate according to the shape of the housing 10 and the like.

Further, the recess 411 having a circular columnar shape, for example, is formed in an upper surface of the piston portion 41. This recess 411 receives the ignition portion 21. A bottom surface of the recess 411 is formed as a pressure receiving surface 411A that receives energy received from the igniter 20 during actuation of the igniter 20. Further, a constricted portion having an outer circumferential surface recessed as compared with other locations is annularly formed along a circumferential direction of the piston portion 41 at an axially intermediate portion of the piston portion 41. An O-ring 43 is fitted into this constricted portion. The O-ring 43 is formed from, for example, rubber (silicone rubber, for example) or a synthetic resin, and functions to increase airtightness between an inner circumferential surface in the large diameter cylinder portion 113 and the piston portion 41.

The rod portion 42 of the projectile 40 is a rod-shaped member having an outer circumferential surface smaller in diameter than the piston portion 41, for example, and is integrally connected to a lower end side of the piston portion 41. A lower end surface of the rod portion 42 is formed as a cutoff surface 420 for cutting off the cutoff portion 53 from the conductor piece 50 during actuation of the breaker device 1. Note that although the rod portion 42 in the present embodiment has a substantially cylindrical tubular shape, the shape thereof is not particularly limited, and can be changed in accordance with the shape and size of the cutoff portion 53 to be cut off from the conductor piece 50 during actuation of the breaker device 1. The rod portion 42 may have a columnar shape such as a circular column or a rectangular column, for example. Note that at the initial position of the projectile 40 illustrated in FIG. 1, a region on the tip end side including the cutoff surface 420 in the rod portion 42 of the projectile 40 is positioned in a cavity portion (forming a portion of the accommodating space 13) of the housing body 100. The diameter of the rod portion 42 is slightly smaller than the inner diameter of an inner circumferential surface of the housing body 100, for example, and the outer circumferential surface of the rod portion 42 is guided along the inner circumferential surface when the projectile 40 is projected.

As described in detail later, the projectile 40 configured as described above is projected from the initial position illustrated in FIG. 1 when the upper surface of the piston portion 41 including the pressure receiving surface 411A receives the energy from the igniter 20 during actuation of the igniter 20, and moves at high speed toward the second end portion 12 side (downward) along the accommodating space 13. Specifically, as illustrated in FIG. 1, the piston portion 41 of the projectile 40 is accommodated inside the large diameter cylinder portion 113 in the top holder 110, and is slidable in the axial direction along an inner wall surface of the large diameter cylinder portion 113. In the present embodiment, the piston portion 41 of the projectile 40 has a substantially circular columnar shape, but the shape thereof is not particularly limited. As the outer shape of the piston portion 41, an appropriate shape and size can be adopted in accordance with the shape and size of the inner wall surface of the large diameter cylinder portion 113.

Conductor Piece

Next, the conductor piece 50 will be described. As illustrated in FIG. 2, the conductor piece 50 is fitted into the conductor piece holding portions 144 of the lower housing body 140 and is disposed crossing the accommodating space 13. The conductor piece 50 is a metal body having conductivity that constitutes a portion of the components of the breaker device 1 and, when the breaker device 1 is attached to a predetermined electric circuit, forms a portion of the electric circuit, and may be referred to as a bus bar. The conductor piece 50 can be formed from a metal such as copper (Cu), for example. However, the conductor piece 50 may be formed from a metal other than copper, or may be formed from an alloy of copper and another metal. Note that examples of metals other than copper included in the conductor piece 50 include manganese (Mn), nickel (Ni), and platinum (Pt).

In one aspect illustrated in FIG. 2, the conductor piece 50 is formed as an elongated flat plate piece as a whole, and includes a first connection end portion 51 and a second connection end portion 52 on both end sides, and the cutoff portion 53 positioned in an intermediate portion thereof. The first connection end portion 51 and the second connection end portion 52 of the conductor piece 50 are provided with connection holes 51A and 52A, respectively. These connection holes 51A, 52A are used to connect with other conductors (lead wires, for example) in the electric circuit. Note that in FIG. 1, the connection holes 51A and 52A in the conductor piece 50 are not illustrated. The cutoff portion 53 of the conductor piece 50 is a site that is forcibly and physically cut by the rod portion 42 of the projectile 40 and cut off from the first connection end portion 51 and the second connection end portion 52 when an abnormality such as an excessive current occurs in the electric circuit to which the breaker device 1 is applied. Notches (slits) 54 are formed at both ends of the cutoff portion 53 of the conductor piece 50, making it easy to cut and cut off the cutoff portion 53.

The conductor piece 50 is cut at a position overlapping the inside surface (inner wall surface) of the inner wall 143 defining the cavity portion 145 of the housing body 100, that is, a position overlapping the outer circumferential surface of the rod portion 42, and the cutoff portion 53 is cut off. In the first connection end portion 51 of the conductor piece 50, a boundary portion with the cutoff portion 53 from which the cutoff portion 53 is cut off is defined as the first cutting edge portion 511, and in the second connection end portion 52, a boundary portion with the cutoff portion 53 from which the cutoff portion 53 is cut off is defined as the second cutting edge portion 521.

Here, various forms of the conductor piece 50 can be adopted, and a shape thereof is not particularly limited. In the example illustrated in FIG. 2, the surfaces of the first connection end portion 51, the second connection end portion 52, and the cutoff portion 53 form the same plane, but the present invention is not limited to this. For example, in the conductor piece 50, the cutoff portion 53 may be connected to the first connection end portion 51 and the second connection end portion 52 in an orientation where the cutoff portion 53 is orthogonal or inclined to the first connection end portion 51 and the second connection end portion 52. Further, the planar shape of the cutoff portion 53 of the conductor piece 50 is not particularly limited, either. Of course, the shapes of the first connection end portion 51 and the second connection end portion 52 in the conductor piece 50 are also not particularly limited. Further, the notches 54 in the conductor piece 50 can be omitted as appropriate.

Coolant Material

Next, the coolant material 60 disposed in the accommodating space 13 in the housing 10 will be described. Here, as illustrated in FIG. 1, prior to actuation of the breaker device 1 (igniter 20), the cutoff portion 53 of the conductor piece 50 in a state of being held in the pair of conductor piece holding holes 105A and 105B in the housing body 100 is horizontally laid crossing the accommodating space 13 of the housing 10. Hereinafter, within the accommodating space 13 of the housing 10 separated by the cutoff portion 53 of the conductor piece 50, a region (space) in which the projectile 40 is disposed is referred to as a "projectile initial arrangement region R1", and a region (space) positioned on the opposite side of the projectile 40 is referred to as an "arc-extinguishing region R2". Note that as described above, since the gap is formed on the side of the cutoff portion 53 disposed crossing the accommodating space 13, the projectile initial arrangement region R1 and the arc-extinguishing region R2 are not completely isolated from each other by the cutoff portion 53, but communicate with each other. Of course, depending on the shape and size of the cutoff portion 53, the projectile initial arrangement region R1 and the arc-extinguishing region R2 may be completely isolated from each other by the cutoff portion 53.

The arc-extinguishing region R2 of the accommodating space 13 is a region (space) for receiving the cutoff portion 53 cut off by the rod portion 42 of the projectile 40 projected during actuation of the breaker device 1 (igniter 20). In this arc-extinguishing region R2, the coolant material 60 as an arc-extinguishing material is disposed. The coolant material 60 is a coolant material for removing thermal energy of the arc generated and the cutoff portion 53 when the projectile 40 cuts off the cutoff portion 53 of the conductor piece 50, and cooling the arc and the cutoff portion 53, thereby suppressing arc generation during cutting off of a current or thereby extinguishing (eliminating) the generated arc.

The arc-extinguishing region R2 in the breaker device 1 is a space for receiving the cutoff portion 53 cut off from the first connection end portion 51 and the second connection end portion 52 of the conductor piece 50 by the projectile 40, and at the same time, has a meaning as a space for effectively extinguishing an arc generated when the projectile 40 cuts off the cutoff portion 53. Then, in order to effectively extinguish the arc generated when the cutoff portion 53 is cut off from the conductor piece 50, the coolant material 60 is disposed as an arc-extinguishing material in the arc-extinguishing region R2.

As one aspect of the embodiment, the coolant material 60 is solid. As one aspect of the embodiment, the coolant material 60 is formed from a shape retaining body. The shape retaining body herein is, for example, a material that can keep a constant shape when no external force is applied and can hold the integrity (does not come apart), even if deformation can occur, when an external force is applied. For example, examples of the shape retaining body include a fibrous body formed into a desired shape. In the present embodiment, the coolant material 60 is formed from a metal fiber that is a shape retaining body. Here, examples of the metal fiber forming the coolant material 60 include an aspect in which at least any one of steel wool or copper wool is included. However, the above aspects in the coolant material 60 are examples, and the coolant material 60 is not limited to the above aspects.

The coolant material 60 is formed into a substantially disk shape, for example, and is disposed at a bottom portion of the bottom container 120.

Operation

Next, operation content when the breaker device 1 is actuated to interrupt the electric circuit will be described. As described above, FIG. 1 illustrates a state of the breaker device 1 prior to actuation (hereinafter also referred to as the "pre-actuation initial state"). In this pre-actuation initial state, in the projectile 40 in the breaker device 1, the piston portion 41 is positioned on the first end portion 11 side (upper end side) in the accommodating space 13, and the cutoff surface 420 formed at the lower end of the rod portion 42 is set at an initial position positioned on the upper surface of the cutoff portion 53 in the conductor piece 50.

Furthermore, the breaker device 1 according to the embodiment further includes an abnormality detection sensor (not illustrated) that detects an abnormal state of a device (such as a vehicle, a power generation facility, or a power storage facility) to which an electric circuit to be cut off is connected, and a control unit (not illustrated) that controls the actuation of the igniter 20. In addition to the current flowing through the conductor piece 50, the abnormality detection sensor may be capable of detecting an abnormal state on the basis of a voltage or a temperature of the conductor piece 50. Further, the abnormality detection sensor may be, for example, an impact sensor, a temperature sensor, an acceleration sensor, a vibration sensor, or the like, and may detect an abnormal state such as an accident or fire on the basis of an impact, a temperature, acceleration, or vibration in a device such as a vehicle. The control unit of the breaker device 1 is a computer capable of performing a predetermined function by executing a predetermined control program, for example. The predetermined function of the control unit may be realized by corresponding hardware. Then, when excessive current flows through the conductor piece 50 forming a portion of the electric circuit to which the breaker device 1 is applied, the abnormal current is detected by the abnormality detection sensor. Abnormality information regarding the detected abnormal current is passed from the abnormality detection sensor to the control unit. For example, the control unit is energized from an external power source (not illustrated) connected to the conduction pins of the igniter 20 and actuates the igniter 20 based on the current value detected by the abnormality detection sensor. Here, the abnormal current may be a current value that exceeds a predetermined threshold value set for protection of a predetermined electric circuit. Note that the abnormality detection sensor and the control unit described above need not be included in the components of the breaker device 1, and may be included in a device separate from the breaker device 1, for example. Further, the abnormality detection sensor and the control unit are not essential components of the breaker device 1.

For example, when an abnormal current of the electric circuit is detected by an abnormality detection sensor that detects an abnormal current of the electric circuit, the control unit of the breaker device 1 actuates the igniter 20. That is, an actuating current is supplied from the external power source (not illustrated) to the conduction pins of the igniter 20, and as a result, the ignition charge in the ignition portion 21 is ignited and burns, generating a combustion gas. Then, the rupture surface 21A ruptures due to rise in pressure in the ignition portion 21, and the combustion gas of the ignition charge is discharged from the inside of the ignition portion 21 into the accommodating space 13.

Here, the ignition portion 21 of the igniter 20 is received in the recess 411 of the piston portion 41, and the rupture surface 21A of the ignition portion 21 is disposed facing the pressure receiving surface 411A of the recess 411 in the projectile 40. Therefore, the combustion gas from the ignition portion 21 is discharged to the recess 411, and the pressure (combustion energy) of the combustion gas is transmitted to the upper surface of the piston portion 41 including the pressure receiving surface 411A. As a result, the projectile 40 moves downward in the accommodating space 13 in the extending direction (axial direction) of the accommodating space 13.

Figure 15:
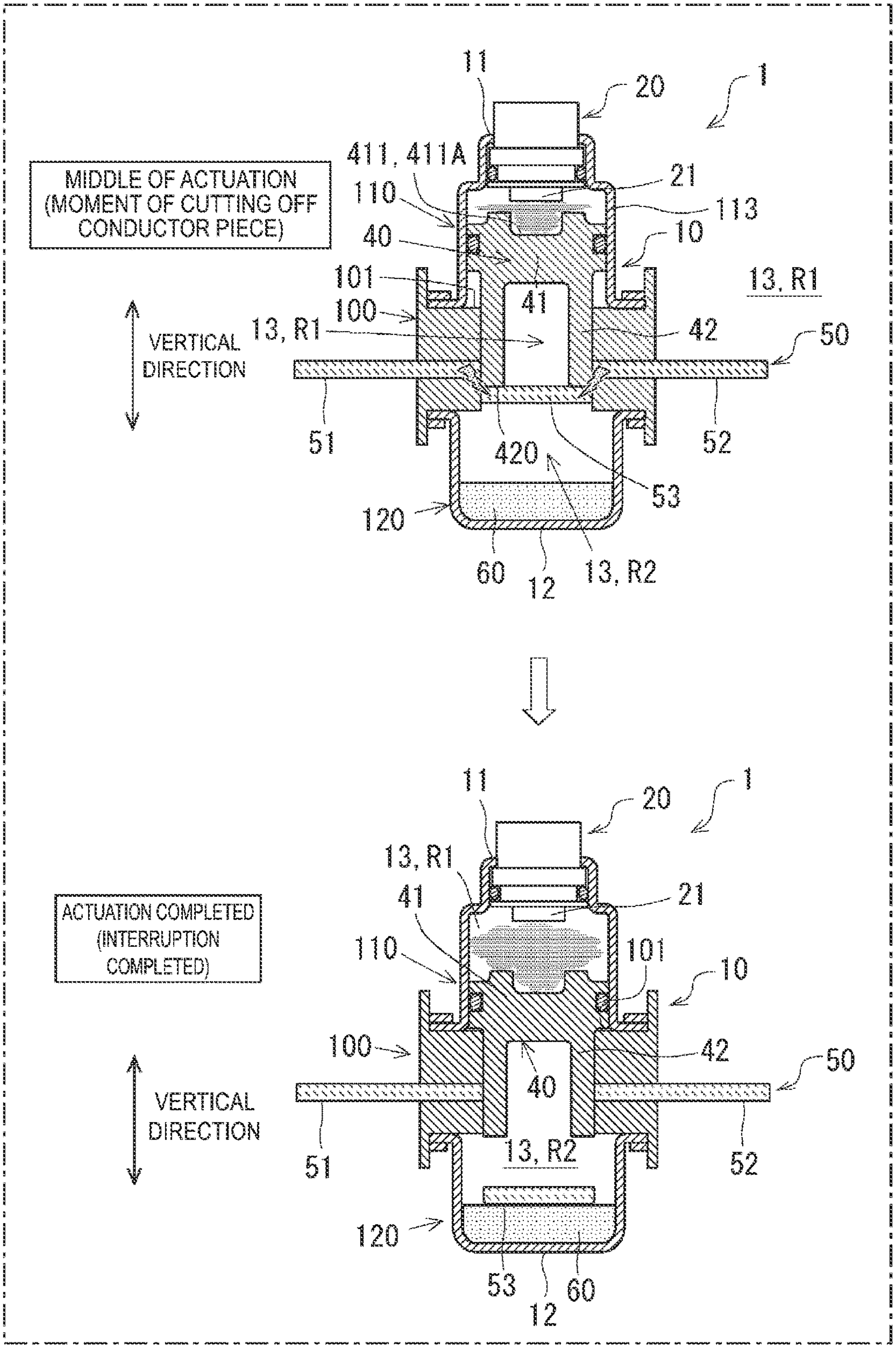
FIG. 15 is a view illustrating an actuation situation of a breaker device 1 according to the embodiment.

FIG. 15 is a view illustrating an actuation situation of the breaker device 1 according to the embodiment. The upper portion of FIG. 15 illustrates a situation in the middle of the actuation of the breaker device 1, and the lower portion of FIG. 15 illustrates a situation in which the actuation of the breaker device 1 is completed. As described above, by the actuation of the igniter 20, the projectile 40 having received the pressure (combustion energy) of the combustion gas of the ignition charge is pushed downward vigorously, and as a result, the cutoff surface 420 formed on the lower end side of the rod portion 42 pushes and cuts, by shearing, boundary portions between the cutoff portion 53 and each of the first connection end portion 51 and the second connection end portion 52 of the conductor piece 50. As a result, the cutoff portion 53 is cut off from the conductor piece 50. Note that as long as the projectile 40 can be moved smoothly in the extending direction (axial direction) of the accommodating space 13 when the igniter 20 is actuated, the shape and the dimensions of the projectile 40 can be freely determined, and the outer diameter of the piston portion 41 of the projectile 40 may be set to a dimension equal to the inner diameter of the large diameter cylinder portion 113 in the top holder 110, for example.

Then, as illustrated in the lower portion of FIG. 15, the projectile 40 moves downward along the extending direction (axial direction) of the accommodating space 13 by a predetermined stroke until the lower end surface of the piston portion 41 abuts on (collides with) the upper surface 101 of the housing body 100. In this state, the cutoff portion 53 cut off from the conductor piece 50 by the rod portion 42 of the projectile 40 is received in the arc-extinguishing region R2 where the coolant material 60 is disposed. As a result, the first connection end portion 51 and the second connection end portion 52 positioned at both ends of the conductor piece 50 are brought into an electrically disconnected state, and a predetermined electric circuit to which the breaker device 1 is applied is forcibly interrupted.

Insulation Resistance after Actuation

As described above, when the breaker device 1 is actuated, the projectile 40 cuts the first connection end portion 51 at the first cutting edge portion 511 (FIG. 2) and the second connection end portion 52 at the second cutting edge portion 521. The first connection end portion 51 and the second connection end portion 52 are in contact with the housing body 100 and the rod portion 42 of the projectile 40, but since the housing body 100 and the rod portion 42 are insulators, the first connection end portion 51 and the second connection end portion 52 are originally brought into a state of being insulated from each other after the breaker device 1 is actuated.

However, at the moment when the cutoff portion 53 of the conductor piece 50 is cut, arc discharge occurs between the cutoff portion 53 and each of the first connection end portion 51 and the second connection end portion 52 that are about to be separated, and the conductor piece 50 evaporates and adheres to the inner wall of the housing body 100 and the outer circumferential surface of the rod portion 42. As described above, when the conductor piece 50 adheres to the inner wall of the housing body 100 and the outer circumferential surface of the rod portion 42 and the contamination degree increases, even though the housing body 100 and the rod portion 42 themselves are insulators, a current flows along the inner wall of the housing body 100 and the outer circumferential surface of the rod portion 42, and the insulation resistance value between the first connection end portion 51 and the second connection end portion 52 may decrease.

Therefore, the breaker device 1 of the present embodiment includes the coolant material 60 in the arc-extinguishing region R2 that receives the cutoff portion 53 after cutting, quickly extinguishes the arc, and suppresses the evaporation amount of the conductor piece 50, thereby suppressing a decrease in the insulation resistance value.

A slight gap is provided between the inner wall of the housing body 100 and the outer circumferential surface of the rod portion 42 and thus the projectile 40 can move in the accommodating space 13 of the housing body 100, and the evaporated conductor piece 50 enters and adheres to this gap, which causes a decrease in the insulation resistance value. Therefore, the breaker device 1 of the present embodiment is provided with the grooves 131 and 141 on the inner wall of the housing body 100, and has a long creepage distance between the first connection end portion 51 and the second connection end portion 52, thereby suppressing the decrease in the insulation resistance value.

Figure 16:
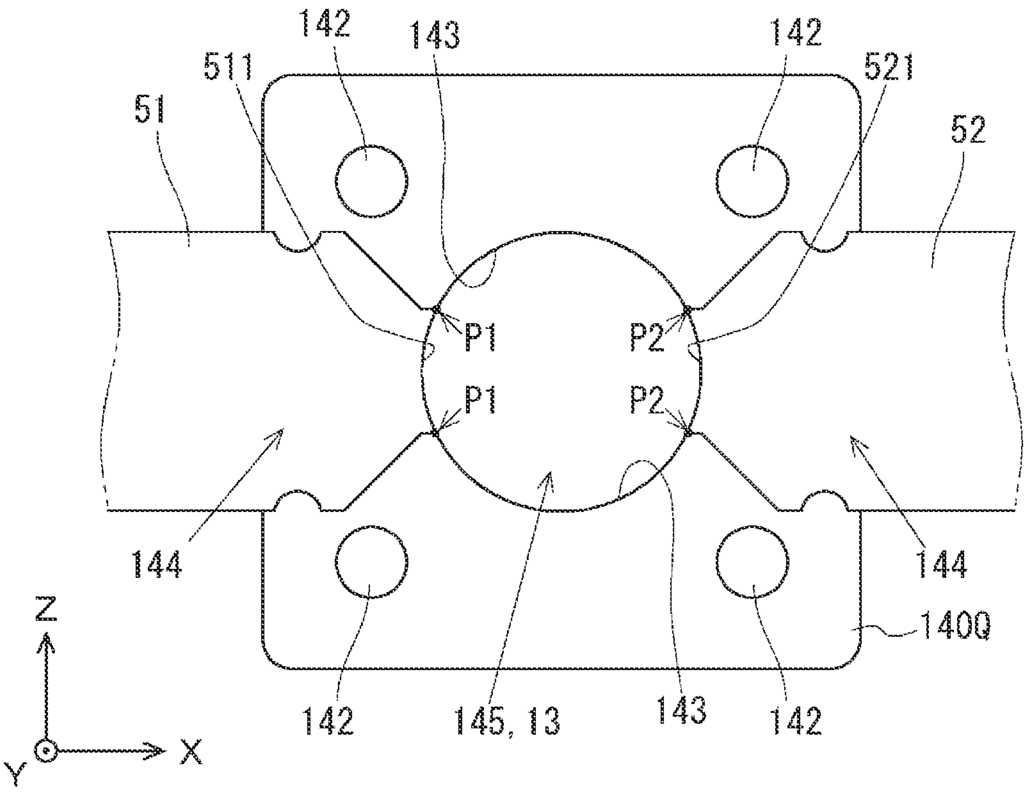
FIG. 16 is a view illustrating, as a comparative example, a lower housing body having no groove and a conductor piece after cutting.

FIG. 16 is a view illustrating, as a comparative example, a lower housing body 140Q not having the groove 141 and the conductor piece 50 after cutting. The configuration of the lower housing body 140Q of the comparative example is the same as that of the lower housing body 140 of FIG. 4 except that the groove 141 is omitted.

As illustrated in FIG. 16, in the first connection end portion 51 after cutting, the end portion on the second connection end portion 52 side is the first cutting edge portion 511, and in the second connection end portion 52 after cutting, the end portion on the first connection end portion 51 side is the second cutting edge portion 521. Furthermore, a position in the first cutting edge portion 511 closest to the second connection end portion 52 along the inner wall 143 is defined as a first end point P1, and a position of the second cutting edge portion 521 closest to the first connection end portion 51 along the inner wall 143 is defined as a second end point P2. When the contamination degree of the inner wall 143 increases, a current flows along the inner wall 143 between the first end point P1 and the second end point P2. That is, the length of the inner wall 143 existing between the first end point P1 and the second end point P2 is the creepage distance.

Figure 17:
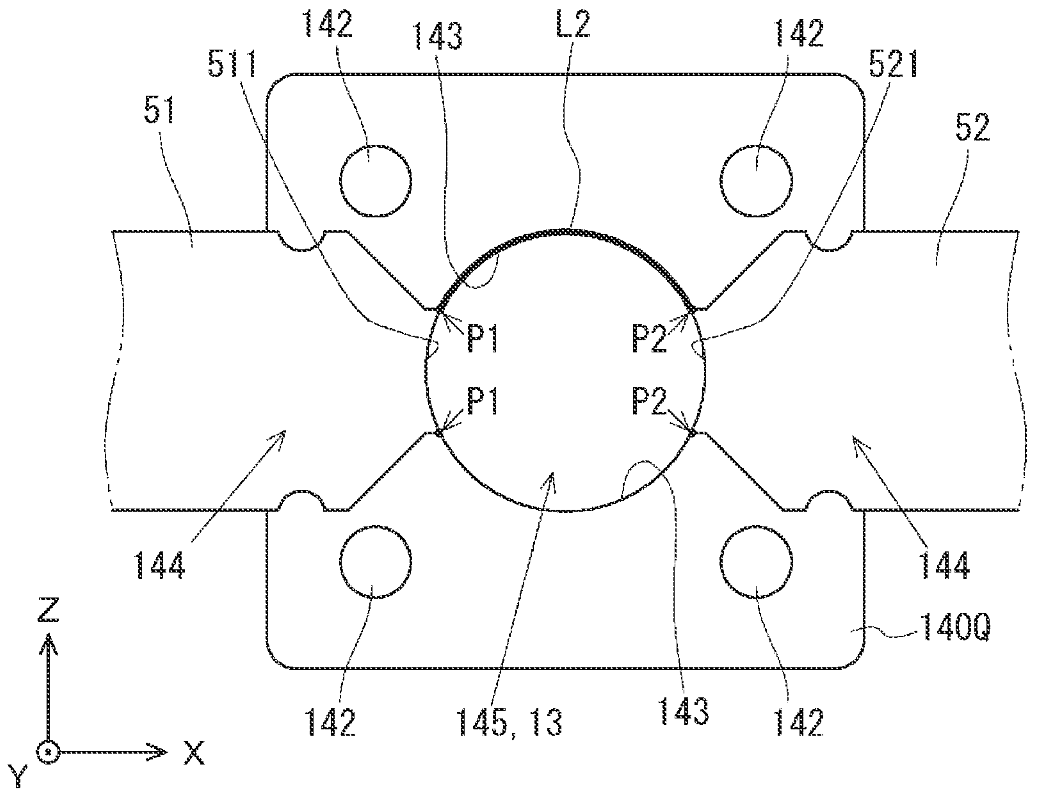
FIG. 17 is a view illustrating a creepage distance in the lower housing body of FIG. 16.

FIG. 17 is a view illustrating a creepage distance in the lower housing body 140Q of FIG. 16. In FIG. 17, in the inner wall 143, an arcuate portion between the first end point P1 and the second end point P2 indicated by thick line L2 is a current path, and the length of the arcuate portion is the creepage distance.

Figure 18:
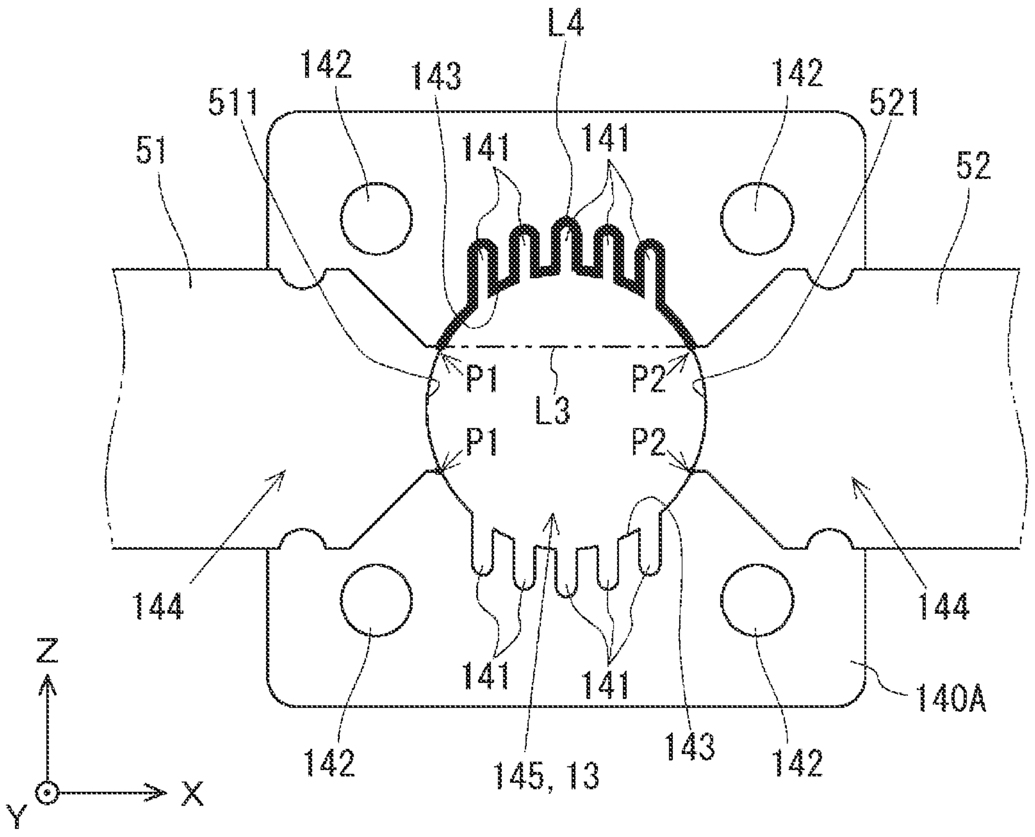
FIG. 18 is a view illustrating a creepage distance in the lower housing body of FIG. 4.

On the other hand, FIG. 18 is a view illustrating the creepage distance in the lower housing body 140 of FIG. 4. As illustrated in FIG. 18, in the lower housing body 140, when the inner wall 143 is viewed from a direction orthogonal to a straight line L3 connecting the first end point P1 of the first cutting edge portion 511 and the second end point P2 of the second cutting edge portion 521, the direction (Z direction) orthogonal to the extending direction (Y direction) of the accommodating space, the inner wall 143 positioned between the first cutting edge portion 511 and the second cutting edge portion 521 is provided with the plurality of grooves 141. In the present embodiment, a total of 10 grooves 141 are provided, where five grooves are provided at each of the positions facing each other in the Z direction in the inner wall 143. For this reason, in the lower housing body 140 of the present embodiment, the current path between the first end point P1 and the second end point P2 is detoured passing through each of the grooves 141 as indicated by thick line L4, and therefore the creepage distance thereof becomes longer than that in the comparative example of FIG. 17. Therefore, as compared with the comparative example, when the evaporation amount of the conductor piece 50 is the same, the breaker device 1 of the present embodiment is low in the density (contamination degree) of the conductor piece 50 adhering to the current path, which allows suppression of a decrease in the insulation resistance value. Although not illustrated, similarly to the case of the lower housing body 140, providing the grooves 131 in the upper housing body 130 can suppress a decrease in the insulation resistance value.

Each of the grooves 131 and 141 has the narrow width LA of the opening formed in the inner wall of the housing body 100 and has an elongated shape in the depth direction, and therefore the evaporated particles of the conductor piece 50 hardly enter deep into the grooves 131 and 141, and the contamination degree on the depth side is low. When there is a location where the current is interrupted even only in a portion of the current path, a high insulation resistance value can be ensured, and therefore the depth side portion of each of the grooves 131 and 141 particularly contributes to ensuring the insulation resistance.

Since the influence of the arc is considered to increase on the lower side where the cutoff portion 53 is received, it is desirable to provide at least the lower housing body 140 with the grooves 141, and the grooves 131 of the upper housing body 130 can be omitted.

Electric Circuit Interruption Test

Figure 19:
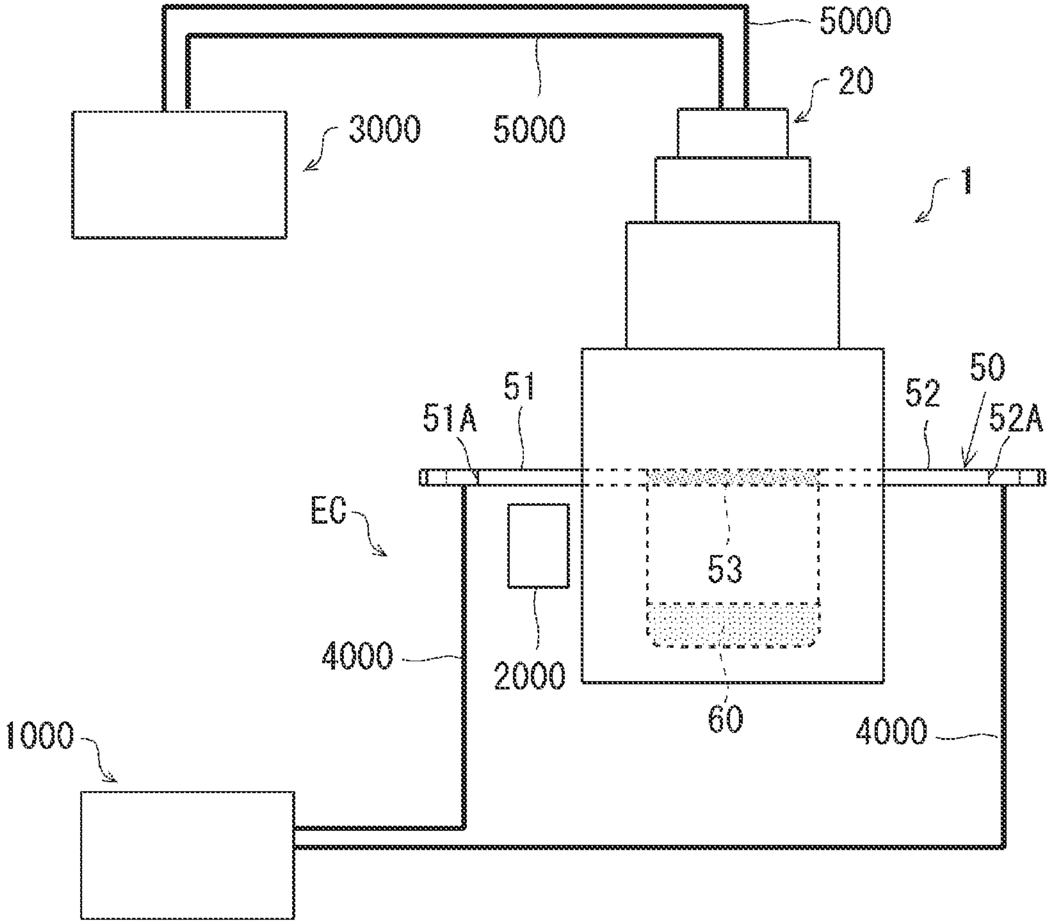
FIG. 19 is a view schematically illustrating a test device used for an electric circuit interruption test.

Next, an electric circuit interruption test performed on the breaker device 1 will be described. FIG. 19 is a view schematically illustrating a testing device used for the electric circuit interruption test. Reference sign 1000 denotes a power source, reference sign 2000 denotes an insulation resistance meter, and reference sign 3000 denotes an actuation power source. Further, reference sign 4000 denotes wiring for forming an electric circuit EC in cooperation with the conductor piece 50 of the breaker device 1. Further, reference sign 5000 denotes wiring for causing an actuation current supplied from the actuation power source 3000 to flow to the conduction pins of the igniter 20 of the breaker device 1. As a comparative example, a test was conducted regarding a breaker device without the grooves 131 and 141. In the breaker device of the comparative example, like the lower housing body 140Q illustrated in FIG. 16 for example, the inner wall defining an internal space 145A does not have the groove 141, and the cross section of the internal space 145A is circular. Although not illustrated, the upper housing body of the comparative example has a similar configuration without the grooves 131.

TABLE 1

| Sample No. | Test conditions | Possible or impossible to interrupt | Presence or absence of slit | Resistance value |
|---|---|---|---|---|
| 1 | 600 V | Yes | None | 4.8 MΩ |
| 2 | 6 kA | | None | 4.5 MΩ |
| 3 | | | None | 3.8 MΩ |
| 4 | | | None | 2.7 MΩ |
| 5 | | | None | 3.8 MΩ |
| 6 | | | Present | 6.2 MΩ |
| 7 | | | Present | 6.3 MΩ |
| 8 | | | Present | 22.6 MΩ |
| 9 | | | Present | 11.6 MΩ |
| 10 | | | Present | 14.0 MΩ |

Table 1 shows a list of conditions and results of the electric circuit interruption test. Test samples No. 1 to No. 5 in the table were tested for the breaker device having no grooves 131 and 141 of the housing body. On the other hand, test samples No. 6 to No. 10 were tested for the breaker device 1 in which the housing body 100 was provided with the grooves 131 and 141 as illustrated in FIGS. 1 to 14.

Next, the steps of the electric circuit interruption test will be described.

(Step 1) As illustrated in FIG. 19, the first connection end portion 51 and the second connection end portion 52 of the conductor piece 50 in the breaker device 1 are each connected to the power source 1000 by the wiring 4000, and the igniter 20 in the breaker device 1 is connected to the actuation power source 3000 by the wiring 5000.

(Step 2) The current from the power source 1000 is caused to flow to the electric circuit EC.

(Step 3) The actuation power source 3000 is turned on and the actuation current is applied to the igniter 20 of the breaker device 1, thereby actuating the igniter 20.

(Step 4) The power source 1000 and the actuation power source 3000 are turned off.

In the present interruption test, each test sample was tested in accordance with the above steps, and the insulation resistance value between the first connection end portion 51 and the second connection end portion 52 when the cutoff portion 53 was cut off from the conductor piece 50 by the projectile 40 was measured by the commercially available insulation resistance meter 2000 (MY40 manufactured by Yokogawa Electric Corporation). As common conditions in each test, the value of the current flowing through the electric circuit EC by the power source 1000 was set to 6 [kA], and the potential difference generated between the first connection end portion 51 and the second connection end portion 52 of the conductor piece 50 after the cutoff portion 53 was cut off in each interruption test was set to 600 [V]. For each sample, cutting of the conductor piece 50 by the projectile 40 was normally performed.

As shown in Table 1, for test samples No. 1 to No. 5 having no grooves, the minimum value of the insulation resistance was 2.7 MΩ, the maximum value thereof was 4.8 MΩ, and the average thereof was 3.92 MΩ. On the other hand, for test samples No. 6 to No. 10 having the grooves 131 and 141, the minimum value of the insulation resistance was 6.2 MΩ, the maximum value thereof was 22.6 MΩ, and the average value thereof was 12.1 MΩ. Thus, test samples No. 6 to No. 10 having the grooves 131 and had results in which the insulation resistance value between the first connection end portion 51 and the cutoff portion 53 was sufficiently high. Test samples No. 6 to No. 10 having the grooves 131 and 141 had results in which the insulation resistance value between the first connection end portion 51 and the second connection end portion 52 was high as compared with test samples No. 1 to No. 5 having no grooves.

Effects of Embodiment

In the breaker device 1 of the embodiment, the coolant material 60 is disposed in the arc-extinguishing region R2. Therefore, the cutoff portion 53 after being cut off that has been received in the arc-extinguishing region R2 can be rapidly cooled by the coolant material 60. Thus, when the cutoff portion 53 is cut off from the conductor piece 50 constituting a portion of the predetermined electric circuit by the projectile 40, even in a case where an arc is generated at the cut surface of the cutoff portion 53 of the conductor piece 50, the generated arc can be quickly and effectively extinguished.

When an arc is generated, it is conceivable that the conductor piece 50 evaporates and adheres to the wall surface or the like and the insulation resistance value between the first connection end portion 51 and the second connection end portion 52 decreases even after the cutoff portion 53 is cut off, but, in the present embodiment, by providing the inner wall of the housing body 100 with the grooves 131 and 141, it is possible to suppress the contamination degree of the inner wall of the housing body 100, suppress the decrease in the insulation resistance value, and ensure high insulation.

VARIATION

Figure 20:
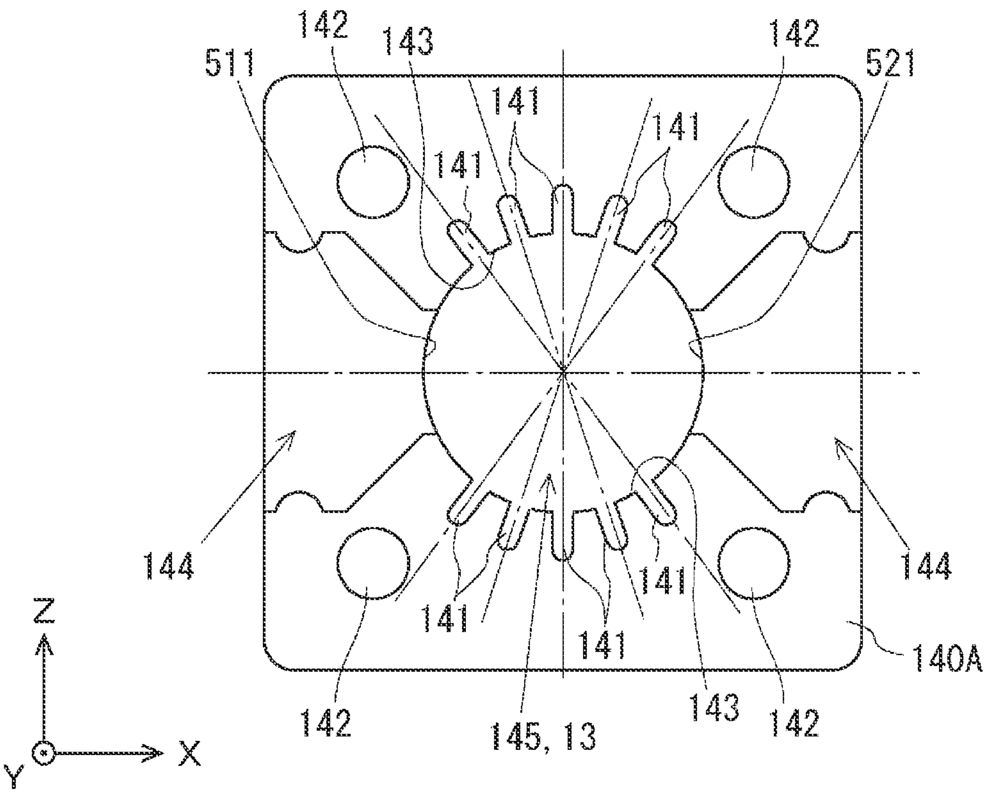
FIG. 20 is a view illustrating a lower housing body according to a variation.

FIG. 20 is a view illustrating a lower housing body 140A according to a variation. In the lower housing body 140 of FIG. 4, the grooves 141 are formed and thus the shapes in the depth direction from the inner wall 143 toward the outer wall are formed in linear shapes parallel to one another on the plane (X-Z plane) orthogonal to the extending direction. On the other hand, in the lower housing body 140A of the present variation, the shapes of each of the grooves 141 in the depth direction from the inner wall 143 toward the outer wall are formed radially spreading outward from the center of the cavity portion 145 (accommodating space 13) on the X-Z plane. Although not illustrated, the grooves 131 of the upper housing body 130 are also formed radially similarly to the grooves 141 of the lower housing body 140A. Note that in the present variation, each of the grooves 131 of the upper housing body 130 and each of the grooves 141 of the lower housing body 140A are provided at the same position in the same shape in plan view, and each of the grooves 131 and each of the grooves 141 are vertically connected. Note that the present invention is not limited to this, and each of the grooves 131 of the upper housing body 130 and each of the grooves 141 of the lower housing body 140A may be provided in different shapes. Other configurations are the same as those of the above-described embodiment.

Even when the grooves 131 and 141 of the housing body 100 are formed radially as described above, the creepage distance between the first connection end portion 51 and the second connection end portion 52 can be lengthened, and therefore a decrease in the insulation resistance value can be suppressed and high insulation can be ensured as in the case of the above-described embodiment.

Figure 21:
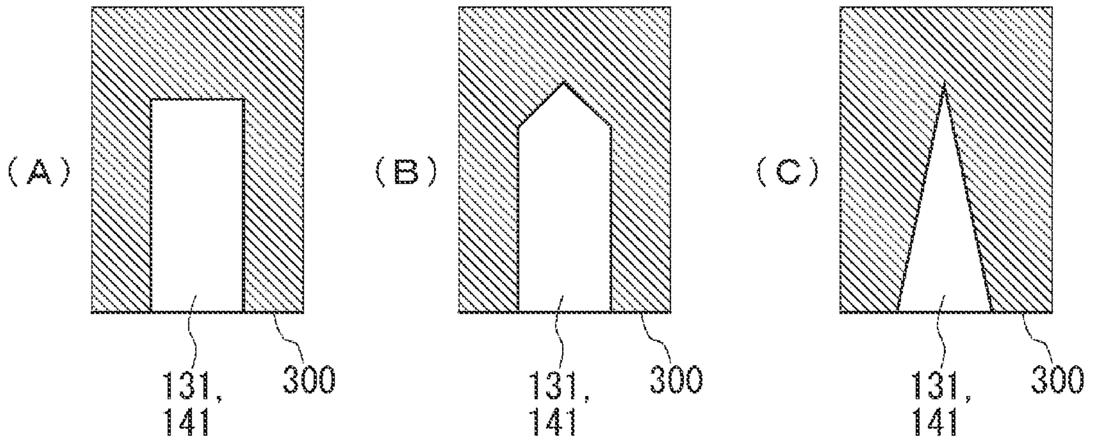
FIG. 21 is a view illustrating examples of a groove shape in a housing body.

FIG. 21 is a view illustrating examples of the shape of the grooves 131 and 141 in the housing body 100. In FIG. 21, reference sign 300 denotes an inner wall of the upper housing body 130 or the lower housing body 140.

For the grooves 131 and 141 of FIG. 21(A), the shape of the depth side end surface in the X-Z plane is formed in a quadrangular shape. For the grooves 131 and 141 of FIG. 21(B), the shape of the depth side end surface in the X-Z plane is formed in a V shape. The grooves 131 and 141 in FIG. 21(C) are each formed with the width decreasing from a surface 300 side toward the depth direction, and have a V shape as a whole.

Thus, even when the grooves 131 and 141 have any of the shapes illustrated in FIG. 21, the creepage distance between the first connection end portion 51 and the second connection end portion 52 can be lengthened, and therefore a decrease in the insulation resistance value can be suppressed and high insulation can be ensured as in the case of the above-described embodiment.

While the embodiment of the electric circuit breaker device according to the present disclosure has been described above, each of the aspects disclosed in the present specification can be combined with any other feature disclosed in the present specification.

REFERENCE SIGNS LIST

1 Breaker device
10 Housing
13 Accommodating space
20 Igniter
40 Projectile
42 Rod portion
50 Conductor piece
53 Cutoff portion
60 Coolant material
100 Housing body
130 Upper housing body
131 Groove
140 Lower housing body
141 Groove

The invention claimed is:

1. An electric circuit breaker device comprising:
a housing that encloses an accommodating space extending in one direction as an outer shell member;
an igniter provided in the housing;
a projectile that is disposed in the housing, is projected from one end side of the accommodating space by energy received from the igniter, and moves along an extending direction of the accommodating space; and
a conductor piece held by the housing and forming a portion of an electric circuit, the conductor piece including a cutoff portion between a first connection end portion of one side and a second connection end portion on the other side, the cutoff portion being to be cut off by movement of the projectile and disposed crossing the accommodating space, wherein
a boundary portion with the cutoff portion from which the cutoff portion is cut off in the first connection end portion of the conductor piece held by the housing is defined as a first cutting edge portion, and a boundary portion with the cutoff portion from which the cutoff portion is cut off in the second connection end portion is defined as a second cutting edge portion, and
a groove is formed at a position corresponding to the conductor piece crossing the accommodating space and in a predetermined inter-edge inner wall region positioned between the first cutting edge portion and the second cutting edge portion, in an inner wall surface of the housing,
wherein the housing includes an upper housing body in contact with an upper surface of the conductor piece, and a lower housing body in contact with a lower surface of the conductor piece, and
wherein the groove is formed in an inner wall of each of the upper housing body and the lower housing body along a direction of a projectile movement.

2. The electric circuit breaker device according to claim 1, wherein the groove extends along an extending direction of the accommodating space.

3. The electric circuit breaker device according to claim 1, wherein a plurality of the grooves are provided at intervals along a circumferential direction of the inter-edge inner wall region.

4. The electric circuit breaker device according to claim 1, wherein a plurality of the grooves are provided parallel to each other or radially in a surface whose depth direction is orthogonal to an extending direction of the accommodating space.

* * * * *